United States Patent
Bail

Patent Number: 5,963,150
Date of Patent: Oct. 5, 1999

[54] GUIDE SYSTEM FOR AN AUTOMOTIVE VEHICLE WITH SEPARATE MOBILE TRANSMITTING DEVICE AND METHOD FOR CONTROLLING THE VEHICLE

[76] Inventor: Gunther Bail, Am Aigen 2, 82491 Grainau, Germany

[21] Appl. No.: 08/809,385

[22] PCT Filed: Sep. 6, 1995

[86] PCT No.: PCT/DE95/01211

§ 371 Date: Mar. 19, 1997

§ 102(e) Date: Mar. 19, 1997

[87] PCT Pub. No.: WO96/09575

PCT Pub. Date: Mar. 28, 1996

[30] Foreign Application Priority Data

Sep. 22, 1994 [DE] Germany ............... 44 33 750

[51] Int. Cl.$^6$ ................. G08G 1/123
[52] U.S. Cl. ........... 340/988; 180/19.2; 280/DIG. 5; 701/214; 701/300
[58] Field of Search ............ 340/988, 323 R; 701/207, 213, 200, 214, 300; 180/167, 19.1, 19.2; 280/DIG. 5

[56] References Cited

U.S. PATENT DOCUMENTS

| | | | |
|---|---|---|---|
| 3,742,507 | 6/1973 | Pirre | 280/DIG. 5 |
| 4,656,476 | 4/1987 | Tavtigian | 280/DIG. 5 |
| 4,894,655 | 1/1990 | Joguet et al. | 340/988 |
| 5,043,903 | 8/1991 | Constant | 342/31 |
| 5,331,561 | 7/1994 | Barrett et al. | 340/903 |
| 5,517,098 | 5/1996 | Dong | 280/DIG. 5 |
| 5,711,388 | 1/1998 | Davies et al. | 280/DIG. 5 |
| 5,810,105 | 9/1998 | Trainer | 280/DIG. 5 |

FOREIGN PATENT DOCUMENTS

| | | | |
|---|---|---|---|
| 4326016 | 9/1994 | Germany . | |
| 3134715 | 6/1991 | Japan . | |
| 5046079 | 2/1993 | Japan . | |
| 6285193 | 10/1994 | Japan | 280/DIG. 5 |
| 7114413 | 2/1995 | Japan . | |

*Primary Examiner*—Brent A. Swarthout
*Attorney, Agent, or Firm*—Juettner Pyle & Piontek

[57] ABSTRACT

A golf cart or caddy and a mobile transmitting device carried by a golf player are each provided with a receiving and evaluating device equipped with a computer for a satellite-controlled positioning system. The two receiving and evaluating devices calculate the respective positions of the golf player and the golf caddy from the signals cyclically received from the satellite system. The mobile transmitting device is provided with a high-frequency manual transmitter which transmits, also cyclically, the positions of the golf player to the golf caddy. The computer of the golf caddy calculates direction and distance of the golf player and stores the data up to the time when the caddy follows the stored path upon a signal. The golf caddy stops at a predetermined distance from the golf player. When a stationary reference transmitter is additionally used for correcting the position data of the golf player and the golf caddy received from the satellite system, specific areas of the golf course can be excluded as forbidden areas, so that these will not be traveled by the golf caddy.

10 Claims, 1 Drawing Sheet

GUIDE SYSTEM FOR AN AUTOMOTIVE VEHICLE WITH SEPARATE MOBILE TRANSMITTING DEVICE AND METHOD FOR CONTROLLING THE VEHICLE

FIELD OF THE INVENTION

The present invention relates to a guide system for an automotive vehicle, in particular golf caddy, according to the preamble of patent claim 1, wherein the vehicle can follow a mobile transmitting device which, in the case of a golf caddy, is carried by a golf player, and can approach the device up to a predetermined distance. The invention, however, is also applicable to other vehicles which are to follow a mobile transmitting device automatically. Moreover, the invention relates to a method according to the preamble of claim 9.

BACKGROUND OF THE INVENTION

German patent specification 43 26 016 discloses an automotive vehicle, preferably a golf caddy, which comprises a high-frequency position finder and an ultrasonic position finder. When the golf caddy has determined the direction of the hand-held transmitter by way of high-frequency position finding, it will approach the transmitter on a straight path at a relatively high speed until it reaches an ultrasonic position finding range in which ultrasonic position finding and reduced speed are automatically switched to. Upon reaching a predetermined minimum distance from the golf player, the golf caddy will stop.

The prior-art golf caddy has already proved to be a success in practice. A disadvantage of the combined high-frequency and ultrasonic position finding system is, however, that the golf caddy does not exactly follow the path which has been predetermined by the golf player with the hand-held transmitter, but approaches the path polygonally, which may be disadvantageous, depending on the condition of the path. The automotive vehicle would not be able to follow a mobile transmitting device along a small winding path, but could only approach such a path laterally, depending on the course of the track. Moreover, the prior-art system does not offer the possibility of banning specific parts of the ground for the automotive vehicle, since it would, for example, move into a pond if the hand-held transmitter was at the other side of the pond and gave the signal "follow".

JP-Abstract 3-134715 A discloses a golf caddy which is equipped with a satellite-controlled positioning system (global positioning system GPS) for determining the exact position. The GPS serves to make visible the position of different golf caddies on a display in a central office.

JP-Abstract 5-046079A also discloses a golf caddy with GPS which serves to store the distance traveled by a golf caddy in a memory using a periodic timer and to display the respective positions of, and the distances covered by, the golf caddy on a display by means of position coordinates of the golf course which are stored on a CD ROM.

U.S. Pat. No. 5,331,561 discloses a system wherein a vehicle without driver follows a lead vehicle at a short predetermined distance on a road. Both vehicles are equipped with a GPS receiver. Using lateral sensors, the lead vehicle gathers side range data which are given by the respective distance between the vehicle and lateral objects. Moreover, the distances which have so far been covered are measured with respect to the respective side range data. The lead vehicle transmits these data to the follower vehicle which also determines such side range profiles and compares these data with the transmitted data. If there are deviations, the course of the follower vehicle will be corrected such that the side range data agree again.

U.S. Pat. No. 5,043,903 discloses a system for supporting the flying movements of helicopters or aircrafts which are flying in a formation. The document is concerned with positioning each aircraft within such a formation and with maintaining the mutual distances between the aircraft.

It is the object of the present invention to provide a guide system for an automotive vehicle which ensures exact guidance. Moreover, a method for exactly guiding a vehicle is to be indicated. Moreover, an improved method for controlling the vehicle is to be indicated.

These objects are achieved according to the invention by the features indicated in patent claims 1 and 9.

Advantageous developments of the invention are characterized in the subclaims.

BRIEF SUMMARY OF THE INVENTION

According to the present invention, both the mobile transmitting device and the automotive vehicle comprise a receiving and evaluating device equipped with a computer for a satellite-controlled positioning system. The satellite positioning system includes, for instance, four satellites which simultaneously send signals which are received and processed by the positioning receivers. The computer of the receiving and evaluating devices determines the coordinates of the respective position from the intercepted signals.

The mobile transmitting device sends its coordinates to the vehicle, the computer of which converts these signals into information about the path to be traveled, i.e. the direction of and distance from the transmitter are calculated.

Hence, the automotive vehicle, preferably a golf caddy, and the mobile transmitting device which is carried by a golf player are in permanent communication with the satellites of a satellite navigation system, and there is a constant data exchange via a radio path from the player to the golf caddy, so that the caddy can calculate and store the respective position data, i.e. the direction of and distance from the mobile transmitting device.

When the golf player sends the signal "come" to the golf caddy, the golf caddy will travel along the stored positions, exactly following the path previously taken by the golf player. Hence, a golf caddy is, for instance, able to follow a golf player, who is a long way ahead, over a small bridge, because the path tracked by the golf caddy is substantially identical with that of the player.

The mobile transmitting device is preferably provided with a high-frequency transmitter, which may be a hand-held transmitter. With the aid of this hand-held transmitter, a golf player will communicate his respective position to the vehicle at regular intervals, preferably every second, with the computer of the vehicle converting the signals into data which will then serve as control signals for the motor, so that the vehicle can follow the path of the transmitting device.

The vehicle should be equipped with sensors for detecting obstacles which are in its way. The sensors may make use of microwaves, ultrasonic waves or infrared waves. When an obstacle located within the track is sensed, the vehicle may be prompted to circumvent this obstacle along a predetermined track which is out of the obstacle's reach. Such alternative tracks may be preprogrammed as suitable sets of curves.

As already mentioned, the position data of the transmitting device (golf player) which are transmitted via the radio path to the vehicle are stored in the computer of the vehicle up to the time when the vehicle receives a START signal. Thereupon, the vehicle will exactly follow the path of the mobile transmitter which is intermittently stored at short time intervals. At any time, the golf player can transmit a STOP signal to the vehicle, whereupon the latter will stop immediately. In the absence of such a signal the vehicle will approach the mobile transmitter (golf player) up to a predetermined distance, preferably set by the golf player, which will automatically be observed by the vehicle (golf caddy).

In another development of the invention, there may additionally be provided a stationary receiving and evaluating device for the satellite-controlled positioning device which sends correction signals to the mobile transmitting device and/or the vehicle. Since the coordinates of this stationary receiving and evaluating device are fixed, the error rate of the satellite navigation system can virtually be reduced to zero, since the position data of the mobile transmitting device and of the vehicle can be calculated with the aid of a so-called differential method in the most accurate manner. The stationary receiving and evaluating device can, for example, be installed in the clubhouse of the golf course.

Specific areas, such as sand traps and water holes of a golf course, can be excluded owing to the use of the stationary reference transmitter, so that the golf caddy does not travel through such zones. When such a zone is entered by a golf player, the golf caddy will remain at the border of the forbidden area or will circumvent the zone to follow the transmitting device when the latter has again left the forbidden area.

The American GBS (Global Positional System) can, for example, be used as the satellite navigation system, with another satellite navigation system, for instance the existing Russian satellite navigation system, being possibly used for increasing the accuracy of the position finding action. When a reference transmitter is used, the accuracy of the position finding action by way of the "differential method" is so high that one of the existing satellite navigation systems is sufficient.

BRIEF DESCRIPTION OF THE DRAWINGS

The vehicle of the invention will follow the mobile transmitter in the open field with maximum accuracy on the predetermined path, provided the transmitter does not enter an excluded area which is forbidden to the vehicle. As a result, the vehicle of the invention is especially well suited in particular, but not exclusively, as a golf caddy.

The system according to the invention shall be briefly explained in the following text with reference to two examples, wherein.

DETAILED DESCRIPTION OF THE PREFERRED EMBODIMENT

The diagrammatic figures deal with a case where the system according to the invention relates to a golf caddy 1 which is to follow a player 2. The receiving and evaluating devices (not shown) of the golf caddy 1 and the mobile transmitting device (also not shown) of player 2 communicate with a satellite system 3, consisting of at least four satellites, and receive from the system signals which are converted by the computers of the receiving and evaluating devices into position data, such as coordinates. Moreover, the high-frequency transmitter of player 2 transmits its calculated position data to caddy 1, the computer of which compares the position data as received from the player with its own position data and calculates and stores distance and direction of the respective position of the player therefrom. Upon a START signal from player 2, caddy 1 follows the stored position data.

Figure 1:
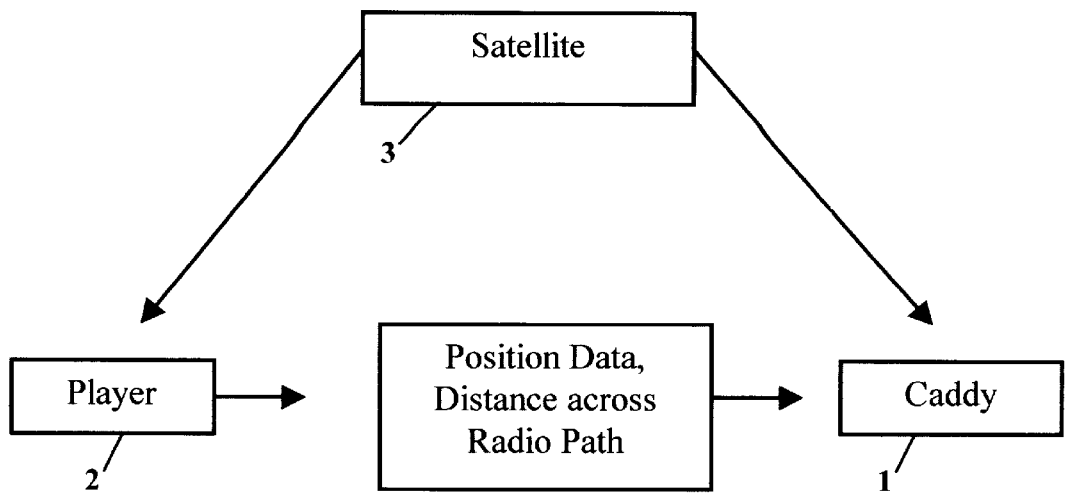
FIG. 1 diagrammatically shows the basic system.
Figure 2:
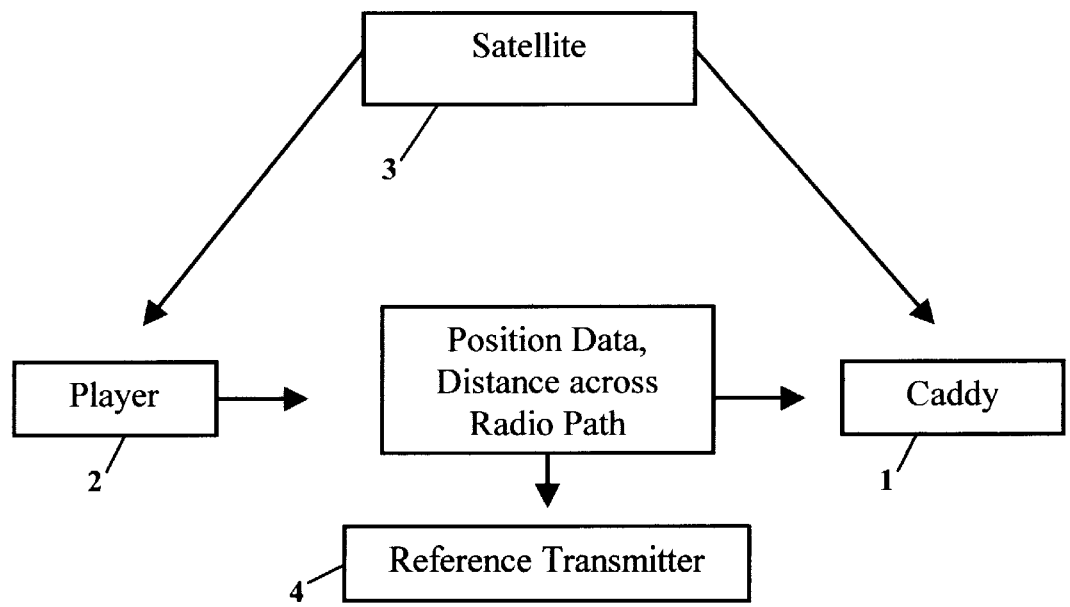
FIG. 2 diagrammatically shows a system of increased positional accuracy.

The system shown in FIG. 2 additionally includes a stationary reference transmitter 4 which also receives position data from the satellite system 3, so that the reference transmitter can calculate correction position data by comparing the position data as received with its fixed and known exact position data, with the correction position data being sent by the transmitter to the computers of the vehicle 1 and the mobile transmitter 2. As a result of the transmission, the computers can calculate their own exact position data.

The receiving and evaluating device of vehicle 1 obtains the—corrected—position data of the player 2, so that the computer of the vehicle can calculate the direction of and distance from the player. These values are stored at an interval of one second.

When vehicle 1 receives a START signal from the player, it will follow the stored track until it has approached the player up to a pretermined distance. At this distance, the vehicle will stop automatically.

It is within the scope of the present invention that vehicle 1 will follow player 2 without receiving a START signal if the distance between vehicle and player exceeds a predetermined, adjustable minimum value.

What is claimed is:

1. A guide system for an automotive vehicle, in particular a golf caddy, wherein the automotive vehicle comprises a drive device, a control device and a signal receiving device, and wherein there is provided a mobile transmitting device which can transmit position signals to the vehicle so that said vehicle can follow the mobile transmitting device, said mobile transmitting device and said automotive vehicle being each provided with a receiving and evaluating device equipped with a computer for a satellite-controlled positioning system from which position data is computed whereupon the vehicle compares the position data of said mobile transmitting device to the position data of said vehicle and from which said vehicle calculates the distance and the respective direction of said mobile transmitting device to said vehicle, said vehicle further storing said distance and respective direction as a sequence of stored positions until said vehicle follows said mobile transmitting device, said guide system further comprising a stationary receiving and evaluating device for said satellite-controlled positioning system which sends correction signals to either of said mobile transmitting device or said vehicle.

2. The guide system according to claim 1, wherein said mobile transmitting device further comprises a high-frequency hand-held transmitter.

3. The guide system according to claim 1 wherein said mobile transmitting device transmits a one Hertz signal indicative of its position to said vehicle.

4. The guide system according to claim 1 wherein said vehicle further comprises sensors for sensing obstacles positioned along its path.

5. The guide system according to claim 4, wherein the sensors are responsive to a transmitter emitting a signal selected from the group of microwave, infrared or ultrasonic signals.

6. The guide system according to claim 1 wherein a memory of the receiving and evaluating device of the vehicle stores the position signals received from said mobile transmitter up to the time when the vehicle travels through the positions.

7. The guide system according to claim 1 wherein the absolute coordinates of areas banned from said vehicle are stored in the computer of said vehicle.

8. A method for controlling an automotive vehicle, preferably a golf caddy, so that the vehicle can automatically follow a mobile transmitting device and can approach said mobile transmitting device up to a predetermined distance, wherein the vehicle and said mobile transmitting device receive signals sent by a satellite system at predetermined time intervals, and calculate their respective positions therefrom, and wherein said mobile transmitting device respectively transmits position signals indicative of said positions to the vehicle from which position data is computed, whereupon the vehicle compares the position data of said mobile transmitting device to the position data of said vehicle and from which the vehicle calculates the distance and the respective direction of the mobile transmitting device to the vehicle, the vehicle further storing said distance and respective direction as a sequence of stored positions until the vehicle follows the mobile transmitting device and wherein said vehicle follows the stored positions upon a signal, characterized in that either of said mobile transmitting device or said vehicle further receive position signals from a stationary reference transmitter from which corrected, exact position data is determined.

9. The method according to claim 8, characterized in that the vehicle approaches the mobile transmitting device only up to a predetermined distance.

10. The method according to claim 8 wherein the vehicle stores the coordinates of a border of forbidden areas transmitted to said vehicle by said stationary reference transmitter and said vehicle circumvents such an area when positions to be traveled into lead through a forbidden area by remaining outside of the border of said forbidden area via a preprogrammed path.

* * * * *